US010965615B2

United States Patent
Hahn

(10) Patent No.: US 10,965,615 B2
(45) Date of Patent: Mar. 30, 2021

(54) CENTRALIZED IP ADDRESS MANAGEMENT FOR DISTRIBUTED GATEWAYS

(75) Inventor: Wolfgang Hahn, Bergfelde (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 184 days.

(21) Appl. No.: 14/388,571

(22) PCT Filed: Mar. 30, 2012

(86) PCT No.: PCT/EP2012/055842
§ 371 (c)(1),
(2), (4) Date: Sep. 26, 2014

(87) PCT Pub. No.: WO2013/143611
PCT Pub. Date: Oct. 3, 2013

(65) Prior Publication Data
US 2015/0052234 A1 Feb. 19, 2015

(51) Int. Cl.
*H04L 12/933* (2013.01)
*H04L 29/12* (2006.01)

(52) U.S. Cl.
CPC .......... *H04L 49/15* (2013.01); *H04L 61/15* (2013.01); *H04L 61/2015* (2013.01); *H04L 61/6013* (2013.01)

(58) Field of Classification Search
CPC ..... H04L 49/15; H04L 61/15; H04L 61/2015; H04L 61/6013; G06F 2009/45595;
(Continued)

(56) References Cited

U.S. PATENT DOCUMENTS 6,094,437 A * 7/2000 Loehndorf, Jr. ..... H04L 12/4641
370/420
6,198,936 B1 * 3/2001 Yang .................. H04W 74/004
455/515
(Continued)

FOREIGN PATENT DOCUMENTS

CN 1302139 A 7/2001
EP 1122915 A2 * 8/2001 ......... H04L 12/2801
(Continued)

OTHER PUBLICATIONS

Wolfgang Hahn, et al.; "3GPP Evolved Packet Core support for distributed mobility anchors"; Control enhancements for GW relocation; 2011 11th International Conference on ITS Telecommunications; p. 264-267.
(Continued)

*Primary Examiner* — David R Lazaro
*Assistant Examiner* — Berhanu Shitayewoldetadik
(74) *Attorney, Agent, or Firm* — Squire Patton Boggs (US) LLP

(57) ABSTRACT

There are provided measures for centralized IP address management for distributed gateways. Such measures exemplarily comprise management of IP addresses for hosts being linked with a plurality of distributed gateway entities via a first host-specific tunnel at a centralized controller entity, and control of the plurality of distributed gateway entities in terms of Internet protocol address management from the centralized controller entity via a second host-specific tunnel on the basis of the managed Internet protocol addresses for the hosts. Accordingly, control-plane and user-plane functions may be separated between the centralized controller entity and the plurality of distributed gateway entities.

26 Claims, 10 Drawing Sheets

(58) Field of Classification Search
CPC ............... G06F 9/45558; G06F 15/177; G06F 17/30477; G06F 17/30; G06F 17/30914
USPC .................................................. 709/223–245
See application file for complete search history.

(56) References Cited

U.S. PATENT DOCUMENTS

| | | | | |
|---|---|---|---|---|
| 6,427,170 | B1* | 7/2002 | Sitaraman | H04L 29/12066 709/226 |
| 6,751,218 | B1* | 6/2004 | Hagirahim | H04L 12/18 370/390 |
| 6,845,094 | B1* | 1/2005 | Zhang | H04L 29/12283 370/349 |
| 7,184,418 | B1* | 2/2007 | Baba | H04L 29/06027 370/331 |
| 7,324,551 | B1* | 1/2008 | Stammers | H04L 47/10 370/230 |
| 7,430,614 | B2* | 9/2008 | Shen | H04L 29/12283 340/9.1 |
| 7,773,539 | B2* | 8/2010 | Gerstel | H04L 41/0806 370/254 |
| 7,991,854 | B2* | 8/2011 | Bahl | H04L 29/12066 709/220 |
| 8,327,436 | B2* | 12/2012 | Randle | H04L 63/0272 726/15 |
| 8,782,285 | B1* | 7/2014 | Cassidy | H04N 21/234309 709/246 |
| 8,804,732 | B1* | 8/2014 | Hepting | H04W 76/11 370/392 |
| 2002/0006780 | A1* | 1/2002 | Bjelland | H04L 12/1403 455/406 |
| 2002/0112072 | A1* | 8/2002 | Jain | H04L 45/22 709/239 |
| 2002/0159463 | A1* | 10/2002 | Wang | H04L 67/1008 370/401 |
| 2003/0018774 | A1* | 1/2003 | Flinck | H04L 61/6013 709/223 |
| 2003/0033379 | A1* | 2/2003 | Civanlar | H04L 41/5054 709/218 |
| 2003/0053170 | A1* | 3/2003 | Levinson | H04B 10/40 398/139 |
| 2003/0055929 | A1* | 3/2003 | Ding | H04L 41/00 709/223 |
| 2003/0091025 | A1* | 5/2003 | Celi, Jr. | H04M 3/4938 370/352 |
| 2003/0095504 | A1* | 5/2003 | Ogier | H04L 69/167 370/235 |
| 2004/0052216 | A1* | 3/2004 | Roh | H04L 61/2503 370/252 |
| 2004/0085997 | A1* | 5/2004 | Mancour | H04L 29/12009 370/466 |
| 2004/0127258 | A1* | 7/2004 | Taketsugu | H04W 88/08 455/560 |
| 2004/0150518 | A1* | 8/2004 | Phillips | H04N 21/4122 340/500 |
| 2004/0165588 | A1* | 8/2004 | Pandya | H04L 63/0272 370/389 |
| 2004/0193648 | A1* | 9/2004 | Lai | H04N 21/4622 |
| 2004/0210320 | A1* | 10/2004 | Pandya | H04L 69/168 700/1 |
| 2005/0041665 | A1* | 2/2005 | Weyman | H04L 45/44 370/390 |
| 2005/0097223 | A1* | 5/2005 | Shen | H04L 61/2061 709/245 |
| 2005/0108518 | A1* | 5/2005 | Pandya | H04L 63/20 713/151 |
| 2005/0165953 | A1* | 7/2005 | Oba | H04L 12/5691 709/238 |
| 2005/0210155 | A1* | 9/2005 | Oeda | H04L 67/2823 709/249 |
| 2006/0080462 | A1* | 4/2006 | Asnis | H04L 41/0809 709/238 |
| 2006/0083315 | A1* | 4/2006 | Sato | H04N 5/4401 375/240.25 |
| 2006/0136570 | A1* | 6/2006 | Pandya | H04L 69/16 709/217 |
| 2006/0168656 | A1* | 7/2006 | Stirbu | H04W 12/0013 726/15 |
| 2006/0223533 | A1* | 10/2006 | Sakata | H04W 24/02 455/436 |
| 2006/0235973 | A1* | 10/2006 | McBride | H04L 67/02 709/226 |
| 2007/0162599 | A1* | 7/2007 | Nguyen | H04L 67/1002 709/225 |
| 2007/0165622 | A1* | 7/2007 | O'Rourke | H04L 67/1002 370/389 |
| 2007/0287459 | A1* | 12/2007 | Diachina | H04B 17/382 455/436 |
| 2008/0033845 | A1* | 2/2008 | McBride | G06Q 10/087 705/28 |
| 2008/0229403 | A1* | 9/2008 | Oswal | H04W 12/0608 726/12 |
| 2008/0244090 | A1* | 10/2008 | Zhu | H04L 29/12216 709/242 |
| 2008/0285492 | A1* | 11/2008 | Vesterinen | H04W 76/12 370/310 |
| 2008/0301273 | A1* | 12/2008 | Brown | H04L 61/6013 709/222 |
| 2009/0059924 | A1* | 3/2009 | Muramoto | H04L 12/1836 370/390 |
| 2009/0116477 | A1* | 5/2009 | Belling | H04L 29/06027 370/386 |
| 2009/0177289 | A1* | 7/2009 | Glanzer | H04W 88/16 700/7 |
| 2009/0232019 | A1* | 9/2009 | Gupta | H04W 28/0268 370/252 |
| 2009/0305662 | A1* | 12/2009 | Ala-Luukko | H04L 65/4061 455/406 |
| 2010/0035578 | A1* | 2/2010 | Ahmed | H04W 12/06 455/411 |
| 2010/0067509 | A1* | 3/2010 | Lambert | H04L 29/12216 370/338 |
| 2010/0115604 | A1* | 5/2010 | Gerber | H04L 45/00 726/15 |
| 2010/0189019 | A1* | 7/2010 | Belfort | H04W 8/02 370/310 |
| 2010/0223363 | A1* | 9/2010 | Sarikaya | H04W 40/24 709/220 |
| 2010/0232353 | A1* | 9/2010 | Hu | H04W 88/16 370/328 |
| 2010/0235481 | A1* | 9/2010 | Deutsch | H04L 29/12367 709/222 |
| 2010/0265884 | A1* | 10/2010 | Vikberg | H04W 40/005 370/328 |
| 2011/0022652 | A1* | 1/2011 | Lai | H04L 67/104 709/202 |
| 2011/0029645 | A1* | 2/2011 | Baykal | H04L 61/2046 709/221 |
| 2011/0051689 | A1* | 3/2011 | Premec | H04W 8/087 370/331 |
| 2011/0083174 | A1* | 4/2011 | Aldridge | H04L 63/0272 726/12 |
| 2011/0103344 | A1* | 5/2011 | Gundavelli | H04W 8/005 370/331 |
| 2011/0149742 | A1* | 6/2011 | Joensuu | H04W 92/14 370/241 |
| 2011/0149971 | A1* | 6/2011 | Zhu | H04L 47/10 370/392 |
| 2011/0222414 | A1* | 9/2011 | Borsos | H04W 24/06 370/248 |
| 2011/0228734 | A1* | 9/2011 | Laganier | H04L 29/12283 370/329 |
| 2011/0236018 | A1* | 9/2011 | Valiveti | H04L 63/0272 398/45 |
| 2011/0274108 | A1* | 11/2011 | Fan | H04L 12/4633 370/390 |
| 2011/0310899 | A1* | 12/2011 | Alkhatib | H04L 45/74 370/392 |

(56) References Cited

U.S. PATENT DOCUMENTS

| | | | | |
|---|---|---|---|---|
| 2012/0027409 A1* | 2/2012 | Agrawal | H04B 10/1129 | 398/58 |
| 2012/0076120 A1* | 3/2012 | Kovvali | H04W 76/11 | 370/338 |
| 2012/0173661 A1* | 7/2012 | Mahaffey | H04L 41/0813 | 709/217 |
| 2012/0202491 A1* | 8/2012 | Fox | H04W 12/0013 | 455/435.1 |
| 2012/0224536 A1* | 9/2012 | Hahn | H04L 45/72 | 370/328 |
| 2012/0246255 A1* | 9/2012 | Walker | H04W 60/005 | 709/208 |
| 2012/0270539 A1* | 10/2012 | Gustavsson | H04W 36/38 | 455/426.1 |
| 2012/0303835 A1* | 11/2012 | Kempf | H04L 41/0695 | 709/235 |
| 2013/0013741 A1* | 1/2013 | Norp | H04W 4/70 | 709/219 |
| 2013/0013792 A1* | 1/2013 | Norp | H04W 4/70 | 709/227 |
| 2013/0097329 A1* | 4/2013 | Alex | H04L 61/1511 | 709/228 |
| 2013/0142166 A1* | 6/2013 | Bogineni | H04W 8/02 | 370/331 |
| 2013/0145375 A1* | 6/2013 | Kang | G06F 9/5083 | 718/104 |
| 2013/0227158 A1* | 8/2013 | Miller | H04L 65/80 | 709/231 |
| 2013/0308527 A1* | 11/2013 | Chin | H04W 64/003 | 370/328 |
| 2014/0204832 A1* | 7/2014 | Van Phan | H04W 16/26 | 370/315 |
| 2014/0362870 A1* | 12/2014 | Huang | H04L 12/2859 | 370/437 |

FOREIGN PATENT DOCUMENTS

| | | | | |
|---|---|---|---|---|
| EP | 1122915 A2 * | 8/2001 | | H04L 12/2801 |
| EP | 2 048 858 A1 | 4/2009 | | |

OTHER PUBLICATIONS

D. Liu, et al.; "Distributed mobility management", draft-liu-distributed-mobility-02; pp. 1-16; Jul. 10, 2010.

Wolfgang Hahn; "Flat 3GPP Evolved Packet Core", Improvement for multiple network connections; pp. 1-5.

K. S. Keshava Murthy, et al.; "NextGen Wireless Access Gateway", Analysis of Combining WiMAX and LTE Gateway functions; pp. 1-6.

M. Patrick; RFC 3046; "DHCP Relay Agent Information Option"; Jan. 2001; pp. 1-14.

International Search Report application No. PCT/EP2012/055842 dated Nov. 20, 2012.

Summons to attend oral proceedings issued in European Application No. 12711191.2 on Jan. 13, 2017.

Chinese Office Action issued in Chinese Patent Application No. 20128003526.1 dated Nov. 30, 2016.

Droms Bucknell University R: "Dynamic Host Configuration Protocol; rfc2131.txt", Internet x.509 Public Key Infrastructure certificate and certificate revocation list (CRL) profile; RFC5280.TXT, Internet society (ISOC) 4, Rue Des Falaises Ch-1205 Geneva, Switzerland, CH, Mar. 1, 1997, XP015007915, ISSN: 0000-0003.

European Office Action issued in corresponding European Patent Application No. 12 711 191.2 dated Oct. 23, 2017.

Nathan Lutchansky, Cornell University, "IPv6 Router Advertisement Prefix Delegation Option; draft-lutchann-ipv6-delegate-option-00.txt", Internet Engineering Task Force, IETF; Standard Working Draft, Internet Society (ISOC) 4, Rue Des Falaises CH-1205 Geneva, Switzerland, Feb. 1, 2002, XP015004261.

* cited by examiner

CENTRALIZED IP ADDRESS MANAGEMENT FOR DISTRIBUTED GATEWAYS

FIELD

The present invention relates to centralized IP address management for distributed gateways. More specifically, the present invention exemplarily relates to measures (including methods, apparatuses and computer program products) for realizing centralized IP address management for distributed gateways.

BACKGROUND

In modern communication systems, including both mobile and fixed networks, which are typically IP based, a significant growth in data traffic is predicted for the future. Accordingly, efforts to cope with such predicted data traffic growth are made in both mobile and fixed IP-based communication systems. Such efforts for example include optimization-related changes e.g. in the current EPC network architecture.

It is to be noted that, while reference is mainly made to 3GPP mobile networks hereinafter, such reference is made by way of example only, and similar considerations equally apply to other types of mobile networks and/or fixed networks accordingly.

As an approach for coping with increasing data traffic, distribution of gateways (also referred to as "Internet gateways") is being applied. Such gateways (GW) to be distributed could for example be include S/PGW, and GGSN in the context of 3GPP mobile networks. Gateway distribution means that a variety of gateways are provided, wherein each gateway serves a part of users or user traffic only for providing access to an external network such as the Internet. Thereby, more direct/optimal routing could be achieved, which decreases traffic latency and/or saves transport cost, in particular e.g. for local traffic (caches, CDN, mobile-to-mobile traffic). The distribution of GWs allows processing of huge amounts of user traffic more efficiently in that optimal routing reduces the usage of transport resources, and content servers and caches can be located nearer to the user.

However, the distribution of GWs and the thus increasing number of GWs as well as interfaces to/from such GWs makes network management more complicated. This is because each GW needs to be configured and needs to maintain interfaces to different servers e.g. for operations, management or policy control. At the same time, such servers usually need some configuration per GW e.g. for security features, thus still increasing network management efforts both in terms of deployment and continuing operation. The increased number of network nodes due to GW distribution thus adds complexity and provides a challenge to the manageability of the network.

More specifically, GW distribution counteracts approaches such as centralization of network management and control functions, virtualization in network nodes and devices and network virtualization and programmable networks, which could also contribute to facilitate copying with increasing data traffic. Accordingly, while GW distribution could be beneficial in terms of cope with increasing data traffic, such approach as such simultaneously hampers realization of other conceivable approaches in this regard and/or degrades their effectiveness.

For example, this may particularly hold true for IP address management including IP address assignment, as explained below.

FIG. 1 shows a schematic diagram of a conventional example of a general network architecture for Internet access, which is applicable in the context of gateway distribution.

As shown in FIG. 1, an end user IP device or host, such as a user equipment UE, connects to the Internet via an IP network by way of an access device (i.e. a base station in a mobile network or e.g. a modem in a fixed network). This access device connects via an access network specific data traffic tunnel to an Internet GW (e.g. GGSN or PGW in 3GPP, e.g. BRAS in a fixed network). This is the point where IP address management for the host is performed, e.g. where the host is assigned with an IP address, and the host becomes visible in the Internet (thus also referred to as Point of Presence, POP). IP address management may be accomplished by cooperation with AAA and/or DHCP servers. Accordingly, the Internet GW terminates the data traffic tunnel and manages IP address for all host served thereby, which is equally the case for all Internet GWs in a GW distribution environment.

FIG. 2 shows a schematic diagram of a conventional example of a 3GPP-based network architecture for Internet access, which is applicable in the context of gateway distribution. That is, FIG. 2 exemplifies an EPS network architecture with 3GPP-defined interfaces or reference points.

As shown in FIG. 2, the general AD of FIG. 1 is realized by an eNB exemplified a LTE base station, and the Internet GW is realized by an S/PGW. The basic underlying operation principle is the same as that described above in connection with FIG. 1. A mobility management entity (MME) selects the GW to what the user plane (UP) tunnel is established from the eNB. The tunnel may for example be implemented with the GTP protocol in a 3GPP-based mobile network, while in a fixed network this tunnel might result from preconfigured selections and preconfigured connections.

FIG. 3 shows a schematic diagram of a conventional example of a 3GPP-based network architecture for Internet access, which exhibits distributed gateways.

The 3GPP-based network architecture according to FIG. 3 may represent an overall view on the entire system being composed of a GW distribution on the basis of a plurality of the 3GPP-based network architecture according to FIG. 2.

As shown in FIG. 3, there are a plurality of Internet GWs such as S/PGWs for providing Internet access between a RAN (or other kind of access or connectivity network) and the Internet. As explained above, each of these plural Internet GWs serves a certain number of users or hosts in terms of Internet access, needs to be configured, and needs to maintain respective interfaces to MME, AAA and DHCP entities, as indicated by dashed lines in FIG. 3. Specifically, IP address management including IP address assignment has to be individually performed at any Internet GW locally, for the thus served users or hosts, respectively.

Therefore, it is desirable to improve the functionality of IP address management including IP address assignment in a network architecture with distributed gateways (or access routers) to connected hosts in terms of a reduction of network management efforts.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising managing, at a centralized controller entity, Internet protocol addresses for hosts being linked with a plurality of distributed gateway entities via a first host-specific tunnel, and controlling the plurality of distributed gateway entities in terms of Internet protocol address management from the centralized controller entity via a second host-specific tunnel on the basis of the managed Internet protocol addresses for the hosts.

According to an exemplary aspect of the present invention, there is provided a method comprising providing a distributed gateway function for hosts being linked via a first host-specific tunnel, obtaining control of Internet protocol address management for the hosts from a centralized controller entity via a second host-specific tunnel, and supervising Internet protocol address management for the hosts via the first host-specific tunnel on the basis of the obtained control of Internet protocol address management for the hosts.

According to an exemplary aspect of the present invention, there is provided an apparatus comprising an interface configured to communicate with at least another apparatus, a memory configured to store computer program code, and a processor configured to cause the apparatus to perform: managing, at a centralized controller entity, Internet protocol addresses for hosts being linked with a plurality of distributed gateway entities via a first host-specific tunnel, and controlling the plurality of distributed gateway entities in terms of Internet protocol address management from the centralized controller entity via a second host-specific tunnel on the basis of the managed Internet protocol addresses for the hosts.

According to an exemplary aspect of the present invention, there is provided an apparatus comprising an interface configured to communicate with at least another apparatus, a memory configured to store computer program code, and a processor configured to cause the apparatus to perform: providing a distributed gateway function for hosts being linked via a first host-specific tunnel, obtaining control of Internet protocol address management for the hosts from a centralized controller entity via a second host-specific tunnel, and supervising Internet protocol address management for the hosts via the first host-specific tunnel on the basis of the obtained control of Internet protocol address management for the hosts.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

The computer program product may comprise or may be embodied as a (tangible) computer-readable (storage) medium or the like on which the computer-executable computer program code is stored, and/or the program is directly loadable into an internal memory of the computer or a processor thereof.

Advantageous further developments or modifications of the aforementioned exemplary aspects of the present invention are set out in the following.

By way of exemplary embodiments of the present invention, there is provided centralized IP address management including IP address assignment for distributed gateways.

Any one of the above aspects enables improving the functionality of IP address management including IP address assignment in a network architecture with distributed gateways (or access routers) to connected hosts in terms of a reduction of network management efforts.

Thus, improvement is achieved by methods, apparatuses and computer program products enabling/realizing centralized IP address management including IP address assignment for distributed gateways.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
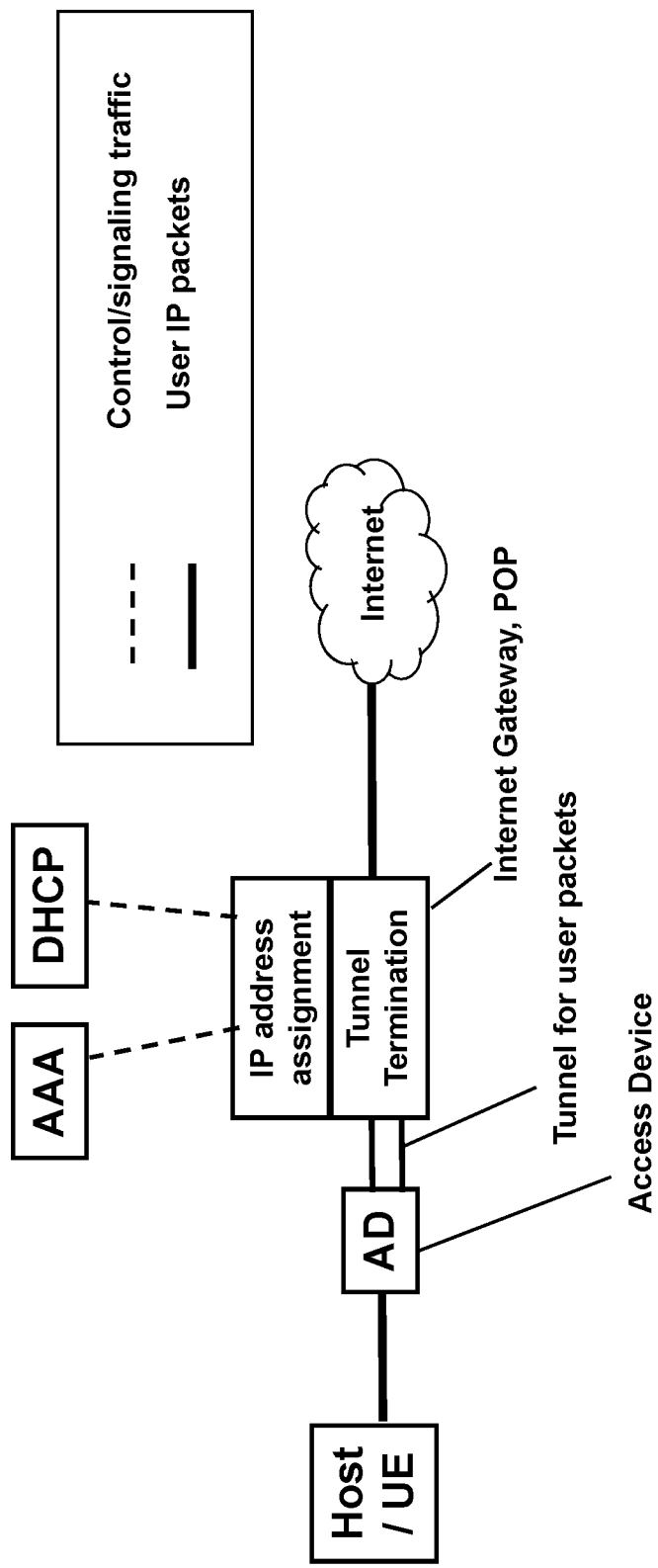
FIG. 1 shows a schematic diagram of a conventional example of a general network architecture for Internet access, which is applicable in the context of gateway distribution.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments.

Namely, the present invention and its embodiments are mainly described in relation to 3GPP specifications being used as non-limiting examples for certain exemplary network configurations and deployments are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any fixed or mobile communication system and/or network deployment with an architecture of distributed gateways for Internet access.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) centralized IP address management including IP address assignment for distributed gateways.

In general terms, the present invention and its embodiments relates to centralization of network management and control functions under the assumption of some level of GW distribution. In addition, the present invention and its embodiments can contribute to virtualization in network nodes and devices and/or network virtualization and programmable networks.

In the following, the present invention and its embodiments are described with reference to mobile networks, which are referred to for illustrative purposes by way of example only. Accordingly, it is noted that the present invention and its embodiments as described herein is equally applicable to fixed networks as well.

Further, the subsequent description is given for the case that the host/UE has only one PDN connection at a time, mainly a connection to the Internet or any other external/private network. In such case, the distributed GWs can be realized by a combined S/PGW, as assumed e.g. in the exemplary illustrations of FIGS. 6 to 8 below. Yet, it is noted that the present invention and its embodiments as described herein is equally applicable to scenarios with plural PDN connections of a host/UE.

Figure 4:
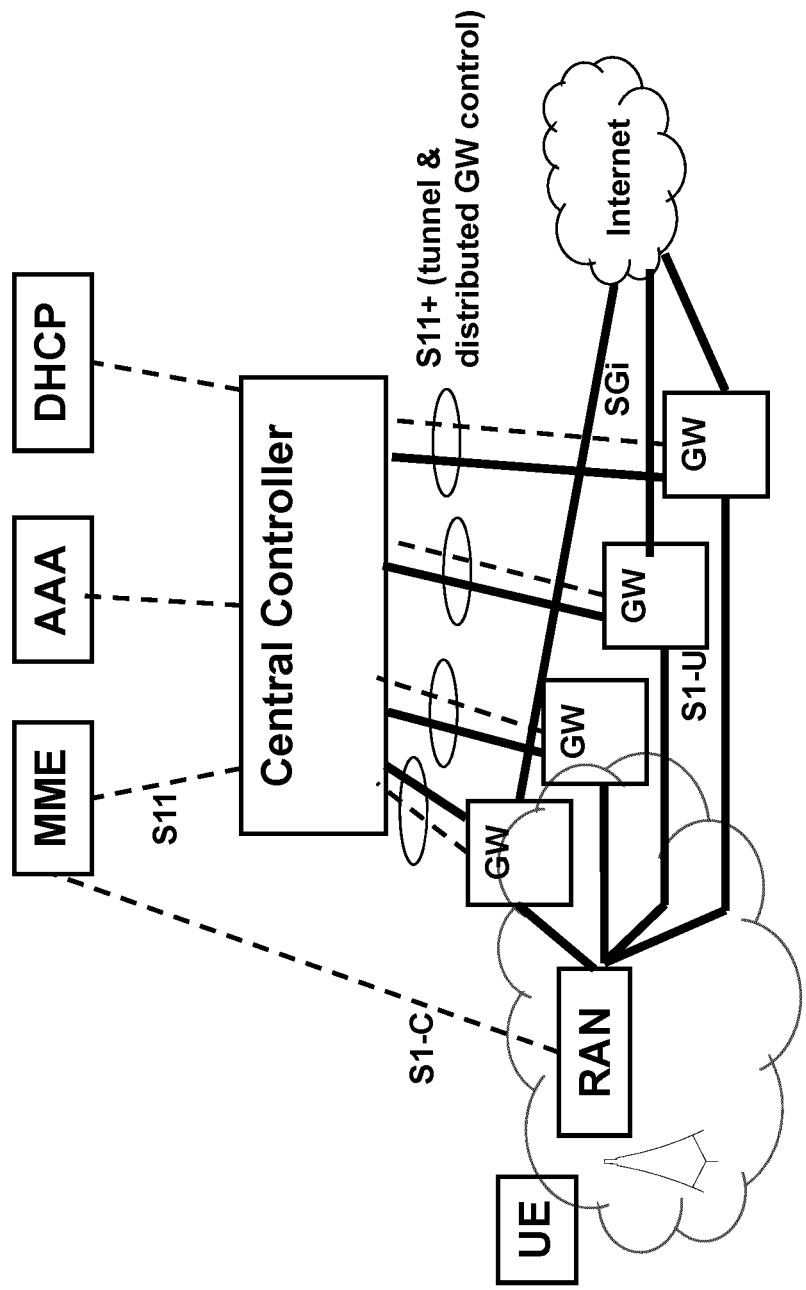
FIG. 4 shows a schematic diagram of an example of a network architecture for Internet access according to exemplary embodiments of the present invention.

FIG. 4 shows a schematic diagram of an example of a network architecture for Internet access according to exemplary embodiments of the present invention.

As shown in FIG. 4, which exemplifies an EPS network architecture exemplifies with 3GPP-defined interfaces or reference points by way of example only, it is evident that a central controller (i.e. a centralized controller entity) is introduced. The central controller according to exemplary embodiments of the present invention interfaces functions as that of any one or more of MME, AAA and DHCP servers or the like and the distributed (Internet) gateways GW providing Internet access to their linked host (such as UEs), respectively. As outlined below, the central controller according to exemplary embodiments of the present invention adopts part of the functionality of conventional (Internet) gateways, especially in terms of IP address management including IP address assignment, and the (Internet) gateways according to exemplary embodiments of the present invention thus lack such functionality transferred to the central controller. Accordingly, as evident from a comparison of any one of FIGS. 1 to 3 with any one of FIGS. 4 and 7 to 9, the (Internet) gateways according to exemplary embodiments of the present invention are simplified in that they do not need any interface to AAA and/or DHCP servers/functions/entities. Thereby, the total number of required interfaces in the overall network architecture according to exemplary embodiments of the present invention is reduced, and the overall network architecture as such is simplified.

Accordingly, when hereinafter reference is made to a distributed GW (or access router), what is meant is a physical GW (or access router) device that lacks the functionality of IP address management with respect to hosts connected to it, but instead provides functionality outlined herein to allow this functionality to be taken over by the central controller.

As shown in FIG. 4, the central controlled is linked with the distributed (Internet) gateways GW by way of a tunnel (indicated by thick lines) and a control interface (indicated by dashed lines), wherein the control interface may be dedicated for distributed GW control. According to exemplary embodiments of the present invention, as indicated in FIG. 4 by ellipsoids around respective pairs of thick and dashed lines, such links between the central controlled is linked and a respective distributed (Internet) gateway GW may be realized by an interface which may be referred to as S11+ interface, as explained below.

The central controller according to exemplary embodiments of the present invention is configured to manage, e.g. assign, IP addresses for hosts being linked with a plurality of distributed gateway entities (GW), and to control the plurality of distributed gateway entities (GW). Such control comprises in a control in terms of Internet protocol address management on the basis of the managed Internet protocol addresses for the hosts, which may be accomplished via the aforementioned tunnel (link). Such control may also comprise distributed gateway control via a control interface, which may be accomplished by the aforementioned control interface (link). Any one of the plurality of distributed gateway entities (GW) according to exemplary embodiments of the present invention is configured to provide a distributed gateway function for hosts being linked thereto, to obtain (i.e. acquire) control of IP address management, e.g. assignment, for the hosts from the central controller, and to supervise IP address management for the hosts on the basis of the obtained (i.e. acquired) control of IP address management for the hosts. They may further be configured to obtain (i.e. gaining) distributed gateway control from the central controller, and to control traffic of the hosts on the basis of the acquired (i.e. gained) distributed gateway control. The IP address management control may be obtained (e.g. in a pull manner from the perspective of the distributed GW) from the central controller via the aforementioned tunnel (link), and the distributed GW control may be obtained (e.g. in a push manner from the perspective of the central controller) from the central controller via the aforementioned control interface (link).

As outlined below, the tunnel between the central controller and the distributed GW (hereinafter referred to as second (host-specific) tunnel) may be linked with the managed IP address of the host in question as such or any other conceivable identifier of the host in question.

Accordingly, the central controller according to exemplary embodiments of the present invention has an IP management (assignment) function (in connection to a distributed GW control function). That is, the central controller according to exemplary embodiments of the present invention manages, e.g. assigns or allocates, IP addresses to devices/UEs on behalf of distributed GWs or access routers, thereby centralizing control functions that conventionally resided in the distributed GWs or access routers, such as the S/PGW in 3GPP-based architectures.

Further, the central controller according to exemplary embodiments of the present invention may have additional functions, such as e.g. support of charging interfaces (and their termination at the centralized controller). Hence, the central controller may perform e.g. charging record generation for offline charging or budget management for online charging, wherein it may rely on accounting messages that are e.g. part of the OF protocol and that are sent to the central controller.

The central controller can also be regarded as a central/centralized gateway entity (provided in addition to the distributed gateway entities). A combination of the central controller and a group (e.g. subset) of the distributed GWs or access routers can be regarded as a logical gateway entity according to exemplary embodiments of the present invention.

Further, according to exemplary embodiments of the present invention, the distributed GWs according to exemplary embodiments of the present invention has a traffic inspection and separation function. That is, any one of distributed GWs according to exemplary embodiments of the present invention is able to inspect traffic from its served hosts as well as separate "IP layer control messages" from this traffic and relay the same to the central controller. The central controller is then able to receive (i.e. obtain) these "IP layer control messages" and to use them in terms of IP address management (assignment) for the respective hosts. The traffic inspection according to exemplary embodiments of the present invention could be based on packet header information, and does not require any deep packet inspection.

In the network architecture according to exemplary embodiments of the present invention, interface-related aspects can be regarded as follows.

From MME point of view only, one GW (or S/PGW) represented by the central controller exists. Consequently, the MME connects to the central controller representing a GW control function e.g. with a standardized S11 interface. The interface between the central controller and the distributed GWs or access routers may provide a subset of the standardized S11 interface functionality, and may support also some modifications and additions depending on the actual implementation. That is the reason why it is termed S11+ in FIG. 4 (as well as FIGS. 7 to 9 below). According to exemplary embodiments of the present invention, the thus denoted S11+ interface may comprise a tunnel (usable for IP address management control) and a control interface (usable for distributed GW control). For example, the central controller may provide a message distribution function to the distributed GWs or access routers in a kind of proxy mode. In case tunnels in the network architecture, as explained below, are operable in accordance with a standardized GPRS tunneling protocol (GTP), the central controller may provide a message distribution function for S11 GTP-C control messages, while GTP-C is also a candidate protocol for the S11+ interface.

Figure 2:
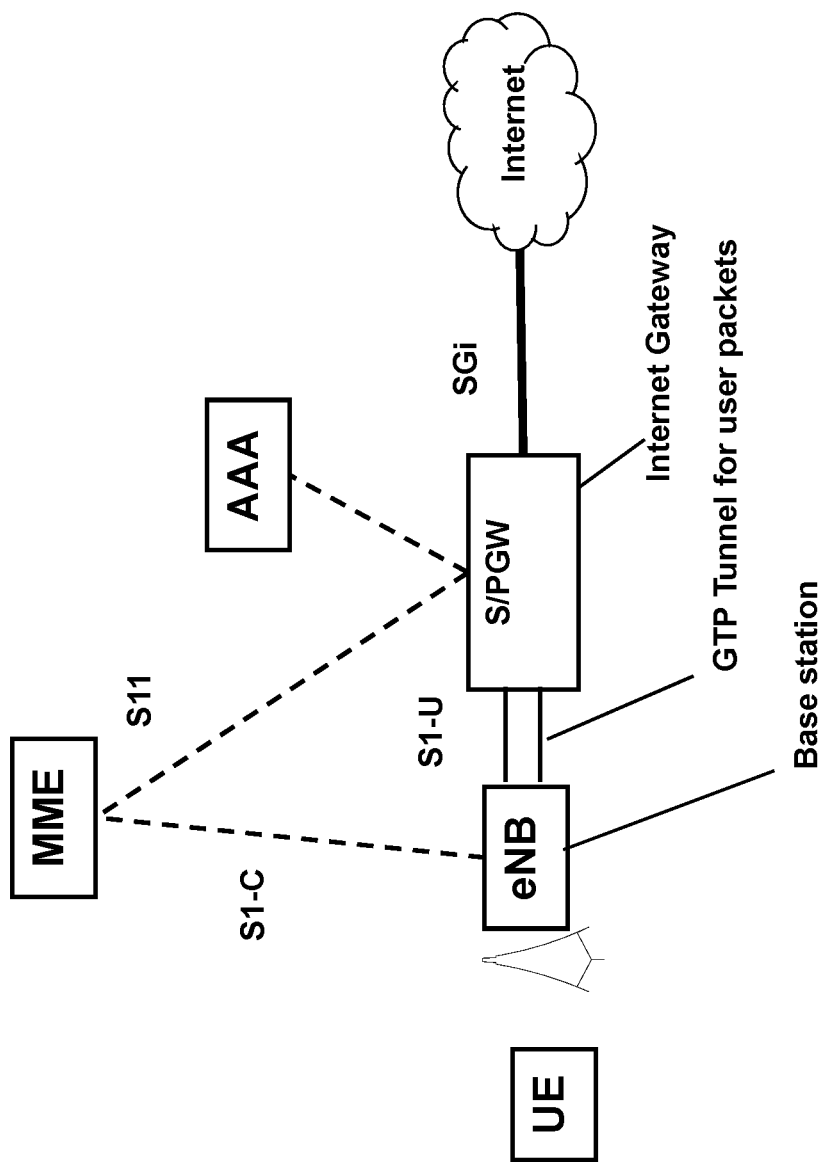
FIG. 2 shows a schematic diagram of a conventional example of a 3GPP-based network architecture for Internet access, which is applicable in the context of gateway distribution.
Figure 3:
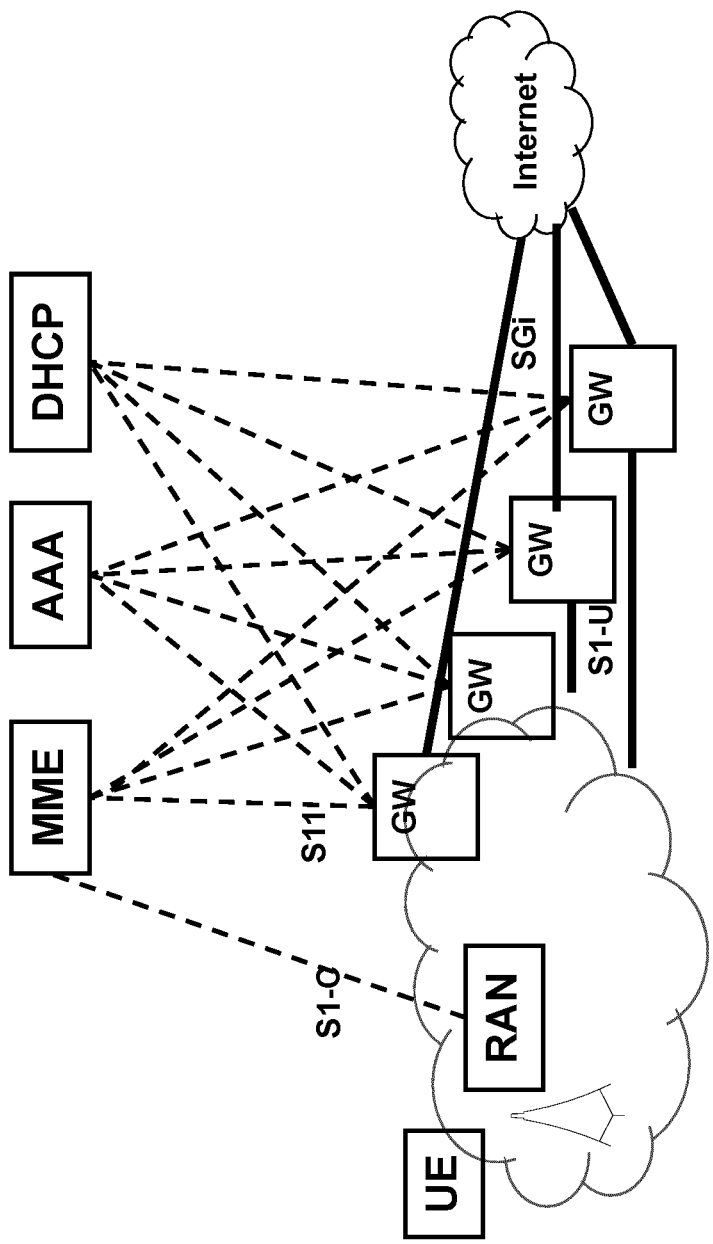
FIG. 3 shows a schematic diagram of a conventional example of a 3GPP-based network architecture for Internet access, which exhibits distributed gateways.

It is noted that, just like in the network architectures of FIGS. 1 to 3 above, the physical distributed GWs still represent the point of presence (POP) for the end devices/UEs in terms of access to the Internet or other private/external networks where packets destined for the end devices/UEs are routed to. Their location in the routing topology of the global Internet or private/external networks thus requires to manage, e.g. assign or allocate, particular IP addresses to the end devices/UEs they serve. While this functionality is thus usually located in each physical GW, it is located in the central controller according to exemplary embodiments of the present invention. The separation and centralization of that functionality to a site remote from the POP will not change the routing as such, but allows for different types of optimization regarding the GW/POP selection and network management.

For example, the separation and centralization of the IP address management functionality to the central controller is effective for mitigating challenges (in particular, in terms of (central) network management and control) of the network architecture with distributed GWs.

According to exemplary embodiments of the present invention, it may be effectively utilized that a gateway or access router (such as S/PGW in 3GPP) contains functionalities that can be centralized like, the control plane operation/functions for IP address management. Otherwise, those functionalities that are to be maintained in a distributed manner (at the POP), like user plane operations/functions for user data forwarding between network interfaces, are maintained in the distributed gateways or access routers. Thereby, a preferable dispersion of operation/functions between central domain and local/distributed domain may be achieved.

Figure 7:
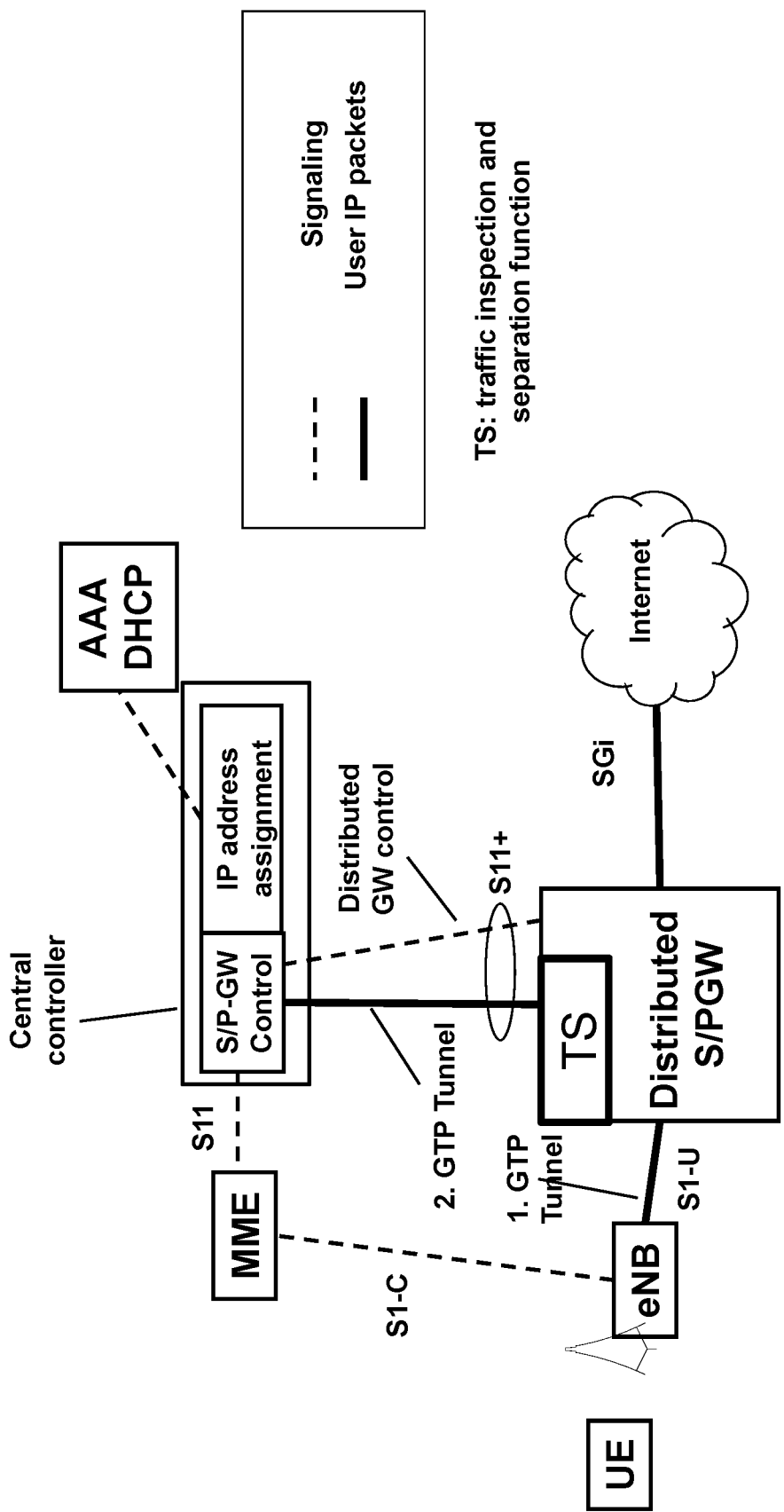
FIG. 7 shows a schematic diagram of a first example of a 3GPP-based network architecture for Internet access according to exemplary embodiments of the present invention.
Figure 8:
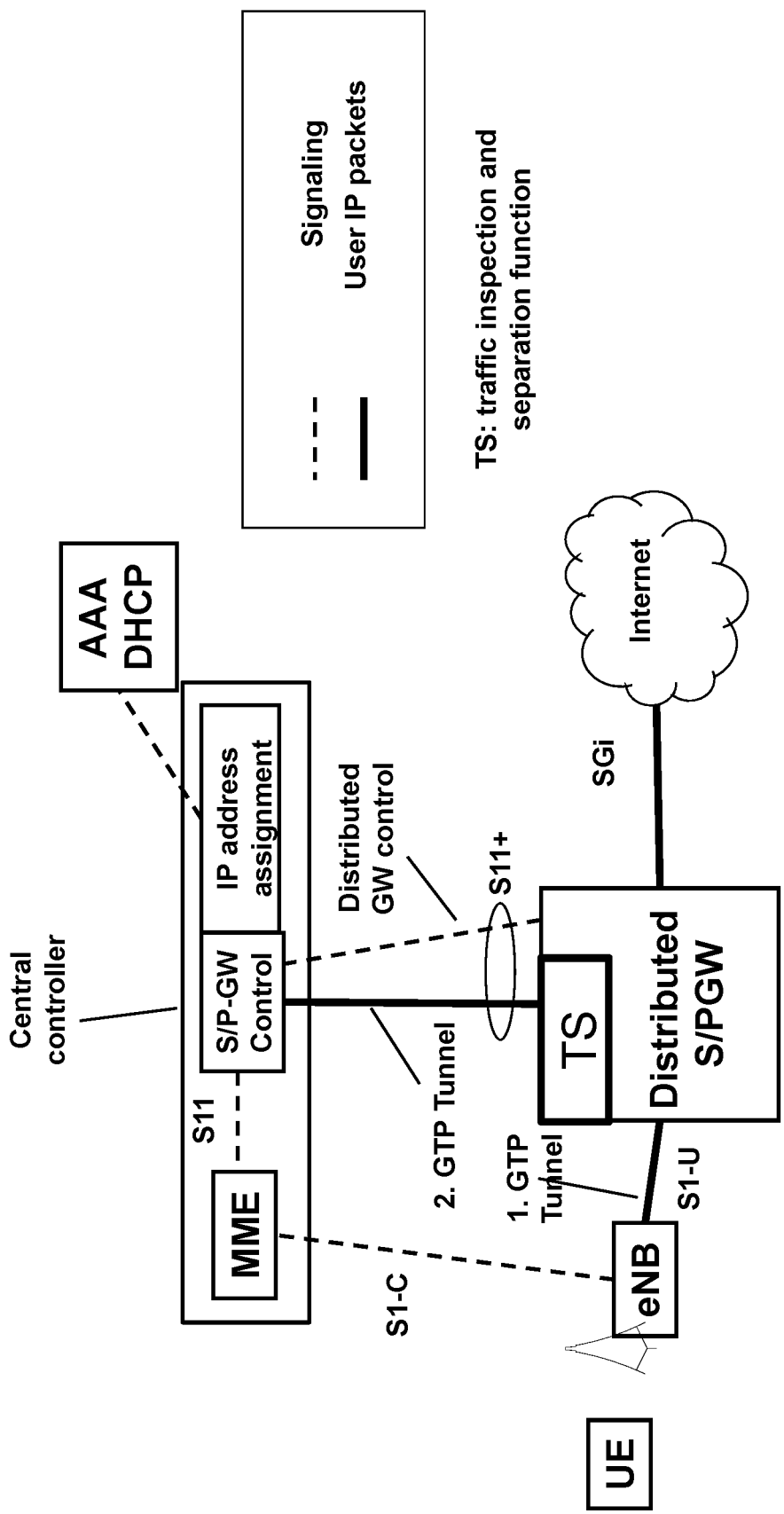
FIG. 8 shows a schematic diagram of a second example of a 3GPP-based network architecture for Internet access according to exemplary embodiments of the present invention.
Figure 9:
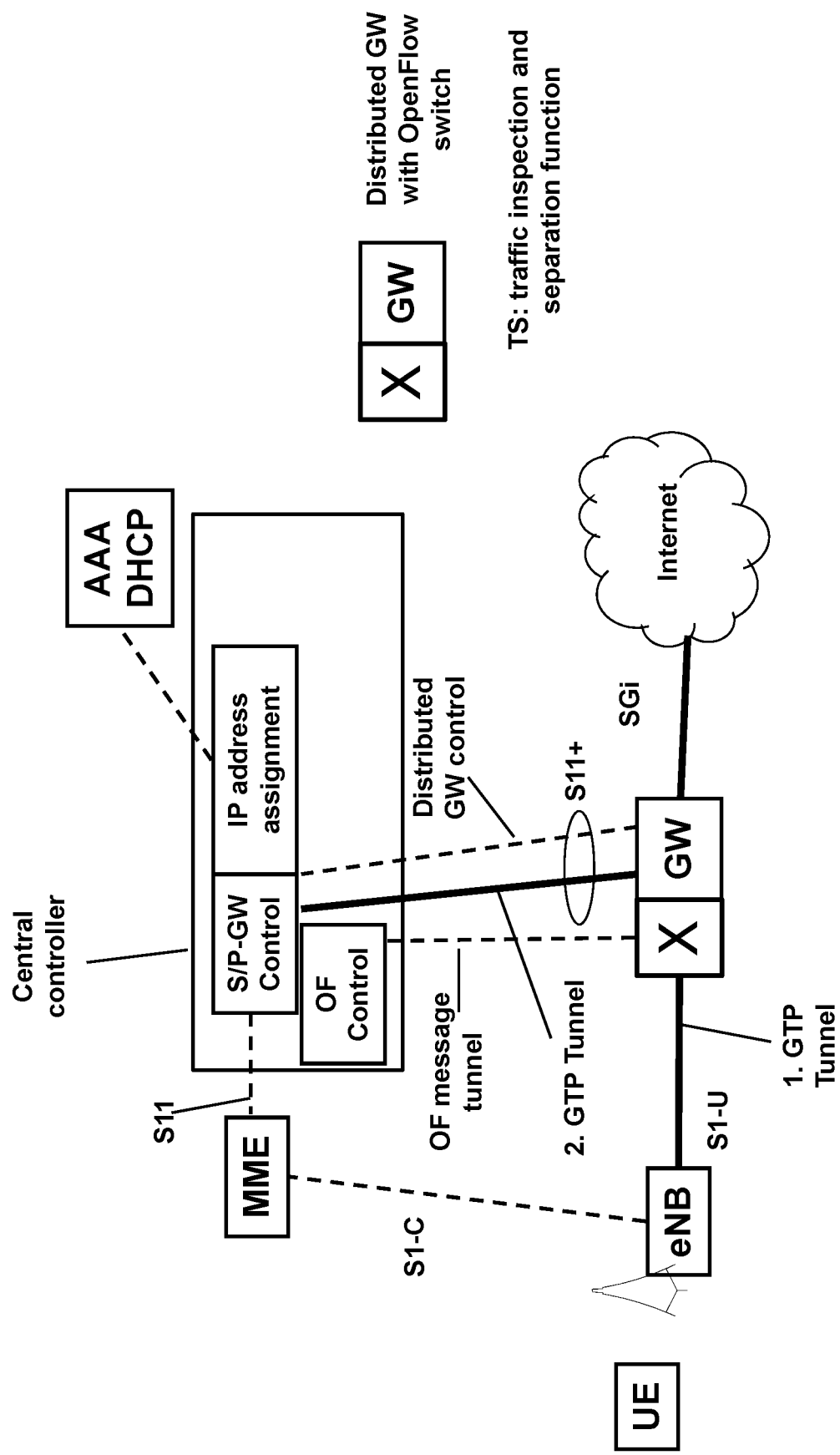
FIG. 9 shows a schematic diagram of a third example of a 3GPP-based network architecture for Internet access according to exemplary embodiments of the present invention.

As is illustrated in FIGS. 7 to 9 below, the linking between hosts and the distributed gateway entities (GW) according to exemplary embodiments of the present invention is accomplished via a (first) host-specific tunnel, and the connection between the central controller according to exemplary embodiments of the present invention and the distributed gateway entities (GW) according to exemplary embodiments of the present invention is accomplished via an interface link (e.g. an S11+ interface) comprising a (second) host-specific tunnel and a control interface.

Namely, a host/UE-specific (e.g. GTP) tunnel may be established between the access device (such as a base station) and any distributed GW. Further, a host/UE-specific (e.g. GTP) tunnel may be established between any distributed GW and the central controller (in addition to a control interface). Details in terms of tunnel establishment are explained below.

Accordingly, existing tunnel-based concepts in the context of IP address management may be effectively utilized according to exemplary embodiments of the present invention.

More specifically, IP address management by the central controller to hosts such as e.g. mobile nodes may be realized on the basis of such tunnel concepts. In case of IPv6, a 3GPP-defined allocation scheme "in tunnel" that is quite similar to fixed networks to allow similar IP stack functions for fixed and mobile hosts may be adopted. In case of IPv4, the so called "deferred IP address allocation" scheme may be adopted, which also uses a user plane (UP) tunnel between the UE and the GW to run IP address assignment with DHCP. Generally, DHCP can equally be used for IPv6 as well.

Figure 5:
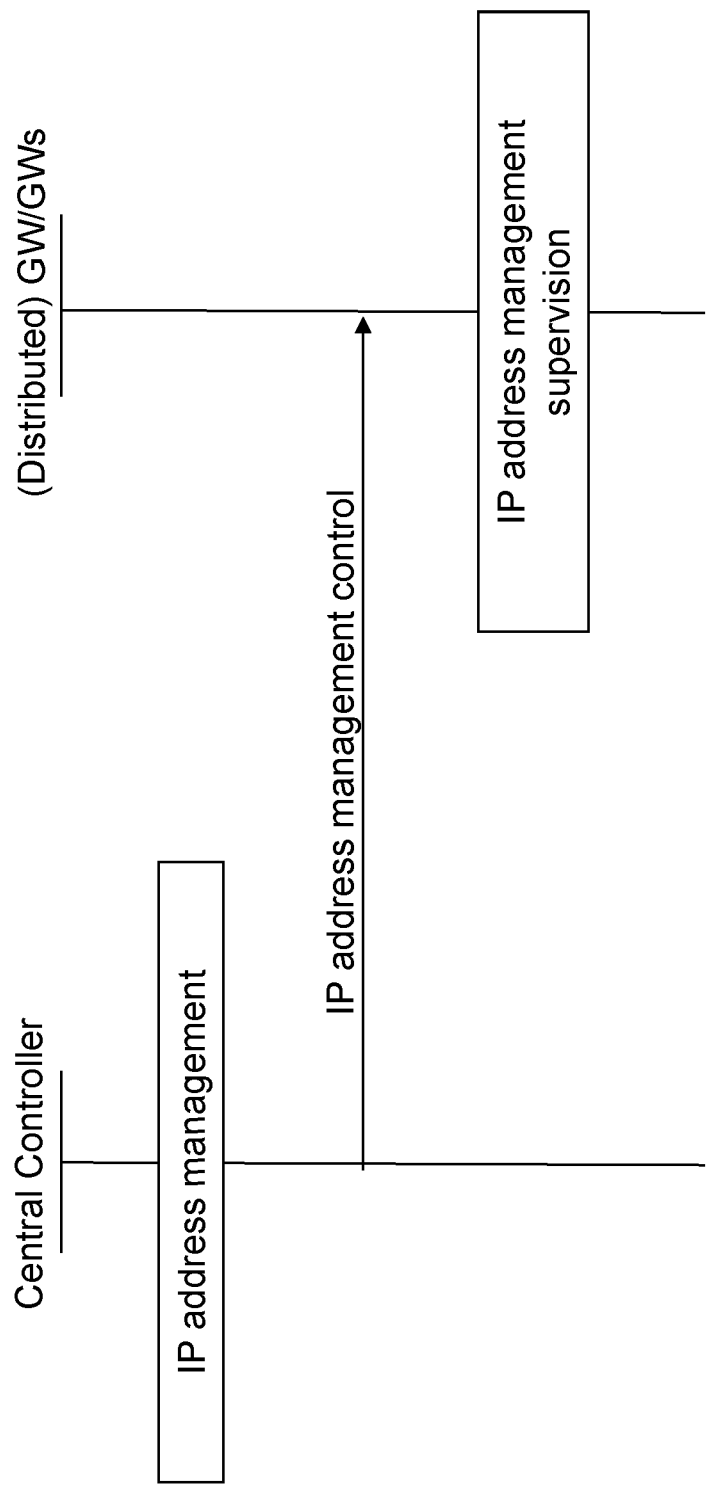
FIG. 5 shows a schematic diagram of a first exemplary procedure according to exemplary embodiments of the present invention.

FIG. 5 shows a schematic diagram of a first exemplary procedure according to exemplary embodiments of the present invention.

As shown in FIG. 5, a procedure according to exemplary embodiments of the present invention may comprise the following operations based on respective functions of the individual entities, namely the central controller and (any one of) the distributed GWs or access routers.

At the central controller, a procedure according to exemplary embodiments of the present invention comprises an operation of managing IP addresses for hosts being linked with a plurality of distributed gateway entities via a first host-specific tunnel, and an operation of controlling the plurality of distributed gateway entities in terms of IP address management via a second host-specific tunnel on the basis of the managed IP addresses for the hosts. At the/any distributed gateway device, which provides a distributed gateway function for hosts being linked via the first host-specific tunnel, a procedure according to exemplary embodiments of the present invention comprises an operation obtaining control of IP address management for the hosts from the central controller via the second host-specific tunnel, and an operation of controlling supervising IP address management for traffic of the hosts via the first host-specific tunnel on the basis of the obtained control of IP address management for the hosts.

Figure 6:
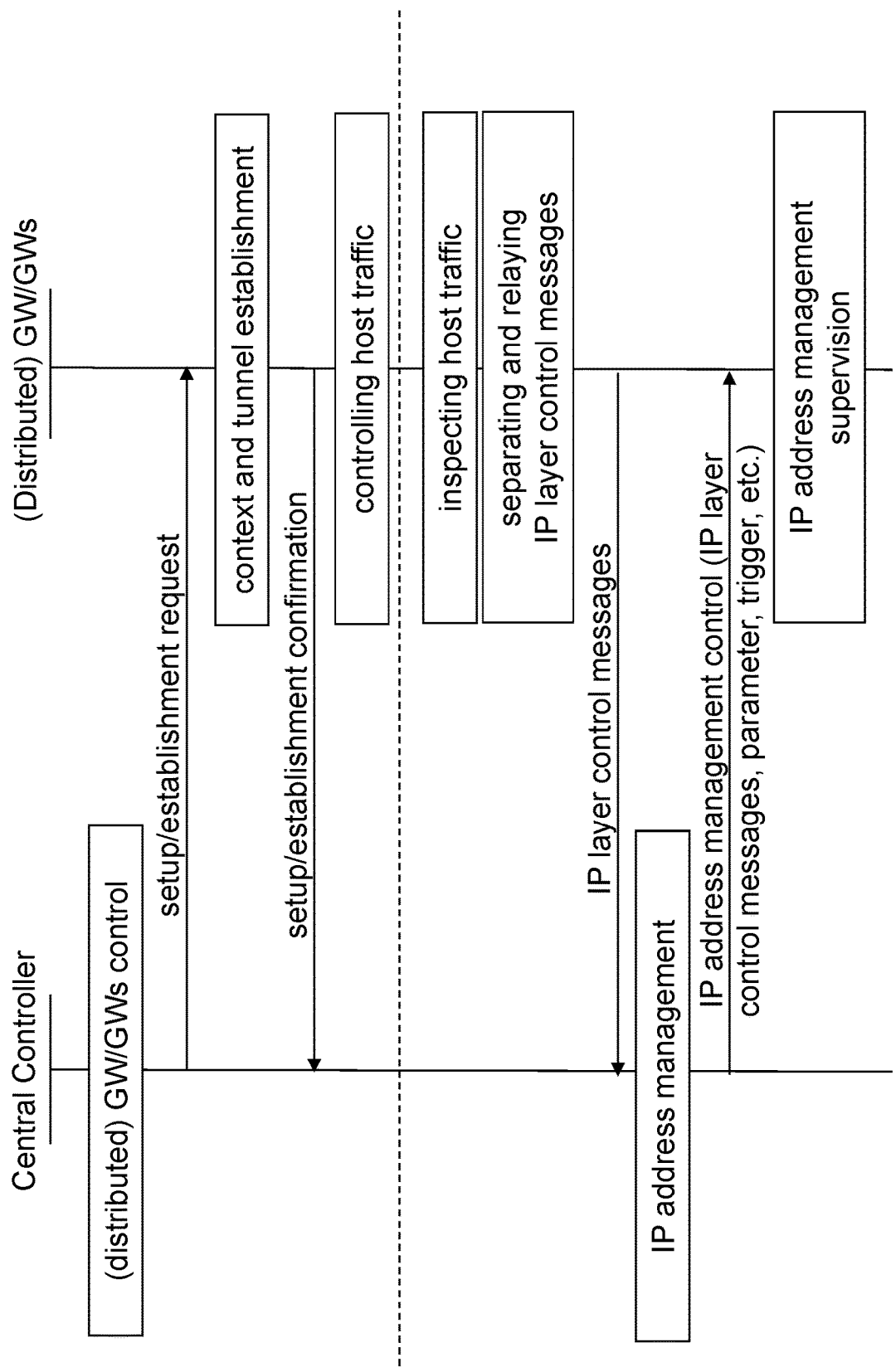
FIG. 6 shows a schematic diagram of a second exemplary procedure according to exemplary embodiments of the present invention.

FIG. 6 shows a schematic diagram of a second exemplary procedure according to exemplary embodiments of the present invention.

As shown in FIG. 6, a procedure according to exemplary embodiments of the present invention may comprise the following operations based on respective functions of the individual entities, namely the central controller and (any one of) the distributed GWs or access routers.

In terms of distributed GW control, the central controller performs control of the plurality of distributed gateway entities via the aforementioned control interface. Such distributed GW control may comprise setup/establishment of a context (and/or (part of) a session) as well as the tunnels, etc., respectively. In this regard, a corresponding request or the like may be transmitted from the central controller to the respective distributed GW. Also, a dedicated parameter (which may be referred to as an IP address management parameter) and/or a specific trigger may be transmitted/signaled (for which details are explained below). Thereupon, the respective distributed GW may perform a corresponding context (and/or (part of) a session) and tunnel establishment or the like (as requested) and transmit a confirmation thereof to the central controller, and then the respective distributed GW may control host traffic accordingly.

The two messages exchanged in this regard relate to a control message part (e.g. a GTP-C control part) of the S11+ interface.

Accordingly, the control interface part of the S11+ interface (e.g. the GTP-C control part), as indicated by dashed lines in FIGS. 4 and 7 to 9, is used to control the distributed GW/GWs as such. This may include setup/establishment of the context (and/or session) and setup/establishment of the first and second tunnels. As the MME recognizes only one GW represented by the central controller, the central controller has a message distribution function to address different distributed GWs in terms of distributed GW control.

In terms of its traffic separation and control function, a distributed GW may inspect traffic of its served hosts (i.e. on the first host-specific tunnel), and separate inspected IP layer control messages inspected from the traffic of the hosts and relay the separated IP layer control messages to the central controller (i.e. via the second host-specific tunnel). Namely, such "IP layer control messages" (that have to be exchanged between the host/UE and the GW anyway) may be separated from the data traffic, and may be relayed (i.e. tunneled) between the UP tunnel from the access device and the UP tunnel to the central controller. For other packets, the (e.g. GTP) tunnel from the access device is terminated at the distributed GW, and user packets are routed to and from the external network/Internet. This requires that the distributed GW inspects the UP traffic for "IP layer control messages" what may especially refer to signaling needed for management (e.g. assignment or allocation) of IP addresses (including both IPv4 and IPv6 addresses) like neighbor discovery protocol messages (e.g. Routing Solicitation) and/or DHCP protocol messages.

In terms of its IP address management function, the central controller may receive (i.e. obtain) the (tunneled) IP layer control messages from traffic of the hosts from any one or more of the plurality of distributed GWs (i.e. via the second host-specific tunnel), and utilize the received (i.e. obtained) IP layer control messages in managing the IP addresses for the hosts. That is, the central controller controls the plurality of distributed GWs in terms of IP address management on the basis of the thus managed (e.g. assigned) IP addresses for the hosts. Such control may for example be accomplished in the form of specific (IP layer) control messages being tunneled to the respective distributed GW and/or transmission/signaling of a dedicated parameter (which may be referred to as an IP address management parameter) and/or a specific trigger. Details in this regard are explained below.

Accordingly, the IP layer control messages are exchanged between the distributed GW and the central controller via the second tunnel, respectively. Each (second) tunnel between the central controller and any one of the distributed GWs is associated with a tunnel identifier (tunnel ID). Hence, the central controller can associate each received IP layer control message, via the tunnel ID of the tunnel carrying the respective message, with the sending distributed GW, and the central controller can associate information relating to the host (e.g. UE) in question and the IP address (to be managed, e.g. assigned) with the tunnel ID, and the central controller can transmit the corresponding IP layer control message to the appropriate distributed GW. The information relating to the host (e.g. UE) may comprise any conceivable host/UE identifier, such as for example IMSI (e.g. when no IP address had previously been assigned to that host), IP address (e.g. when an IP address had previously been assigned to that host), etc.

In view of the above, a host-specific context may be established in terms of the tunnel concept for IP address management according to exemplary embodiments of the present invention. Namely, each host may have its own first and second tunnels.

Accordingly, the second tunnel to be used in terms of IP address management according to exemplary embodiments of the present invention may be linked with the managed IP address of the host in question as such or any other conceivable identifier of the host in question (such as any (radio) access network related (user/subscriber/host) identification, e.g. IMSI, etc.).

On the basis of the control obtained from the central controller (i.e. under the control of the central controller) in terms of IP address management, a distributed GW is able to supervise IP address management for the hosts (i.e. via the first host-specific tunnel). In such supervision control, IP layer control messages may be appropriately forwarded to/from the hosts.

The two messages in this regard relate to IP address management control part of the S11+ interface.

The part of the exemplary procedure, which is above the dashed line, relates to the control interface (of the S11+ interface link), e.g. a GTP-C control part, for distributed GW control. The part of the exemplary procedure, which is below the dashed line, relates to the tunnel (of the S11+ interface link) for (in-tunnel) IP address management control.

Namely, as explained above, the (e.g. S11+) interface link between the central controller and distributed GW/GWs according to exemplary embodiments of the present invention includes both the control interface and corresponding control messages (e.g. GTP-C protocol) and the second host-specific tunnel and corresponding control messages.

As evident from the above, in contrast to conventional solutions, exemplary embodiments of the present invention effectively utilize a central controller exhibiting a centralized IP address management function. Accordingly, the GWs/PGWs do not terminate (e.g. 3GPP-specific) signaling related to the attach procedure, and do not finally implement IP address management.

According to exemplary embodiments of the present invention, tunnel establishment may be realized as follows.

As mentioned above, according to exemplary embodiments of the present invention, a second tunnel is established between any distributed GW and the central controller, which is used for handling IP addressing issues remotely from the distributed GW, in addition to the first tunnel established between an access device in the hosts' access or connectivity network and any distributed GW. Both tunnels may be established at the same time, e.g. at the time of session establishment.

In a 3GPP-based system, 3GPP-defined procedures can be basically used for such tunnel establishment according to exemplary embodiments of the present invention. During the attach procedure of the host/UE to the network system, the (e.g. GTP) tunnels may be set up with session management messages. When there are SGW and PGW collocated, the PGW is local to the SGW and does not need an S5 interface setup for the tunnel between SGW and PGW. So, the central controller can use the S5 interface setup for the second tunnel. Therein, the distributed GW may be in the role of the SGW and the central controller may be in the role of the PGW. The central controller may set its own IP address as PGW address (usable for establishment of the tunnel towards the distributed GW/GWs), e.g. in S11+ messages. In addition thereto, a dedicated parameter (which may be referred to as an IP address management parameter) may be set by the central controller to signal and enable corresponding functions at the central controller and/or any distributed GW. More specifically, such dedicated parameter may indicate "Remote IP address management/assignment and local SGi interface (local PGW)". Any distributed GW may still function as PGW on the user plane and provide packet routing to external networks/the Internet.

According to exemplary embodiments of the present invention, IP address assignment in the context of IP address management may be realized as follows.

As usual, according to exemplary embodiments of the present invention, IP address assignment may take place during the attach procedure of the host/UE to the network system. Additional IP addresses may still be assigned later with a PDN connectivity procedure, e.g. when multiple networks are connected to the host/UE.

In a 3GPP-based system, 3GPP-defined procedures can be basically used for IP address assignment according to exemplary embodiments of the present invention. The standard 3GPP signaling messages between MME and SGW (i.e. on the S11 interface) are terminated in the centralized controller. For IPv6 bearers, the central controller assigns or allocates a unique interface identifier for the host/UE and sends it during the attach procedure via the S11 interface, the S1 interface and NAS session management signaling to the host/UE. After selection of the distributed GW/POP, the central controller assigns or allocates an UE IP address (in IPv6, a prefix) from available prefix/address ranges of the selected GW/POP (e.g. according to routing needs). For this purpose, the central controller can use internal data bases and/or functions typically provided by AAA and/or DHCP servers.

As mentioned above, the central controller according to exemplary embodiments of the present invention may trigger context establishment in the selected distributed GW on the S11+ interface. This may for example be accomplished by S11 "create session" messages. The aforementioned dedicated parameter may indicate the application of the remote IP address assignment at the central controller to the selected distributed GW. The context establishment in the distributed GW may then activate the traffic inspection and separation function in the distributed GW, as well as the tunnel between the distributed GW and the central controller. Thereby, it is enabled that the S1 (e.g. GTP) tunnel terminated in the distributed GW is inspected for IP control messages sent by the UE (that are usually exchanged between a host and the first hop router). These messages may then be tunneled further to the central controller.

After establishment of a PDN connection (including e.g. radio bearer, S1 GTP tunnel, etc.), the UE may for example send Router Solicitation (RS) messages (for IPv6) to the network as usual to get an IPv6 address or DHCP messages for "deferred address allocation" to get an IPv4 address. In this regard, the central controller is in the role of the first hop router (and possibly even the only router towards the Internet or external network) and finalizes the address allocation. This may for example be accomplished by sending Router Advertisement (RA) messages or working as a DHCP relay for DHCP-based address allocation and sending responses in the second tunnel to the distributed GW and back to the UE. When IPv4 is used for the PDN connection, an IP L3 control message forwarding is only needed for "deferred IPv4 address allocation" with DHCPv4. Otherwise, host/UE-specific ("out of band") signaling (e.g. on/by S11, S1, NAS) has already provided the IP address to the host/UE.

In the following, three examples of network architectures are given for 3GPP-based network systems for illustrative purposes by way of example only.

In any one of FIGS. 7 to 9 below, it is evident that, as general aspects according to exemplary embodiments of the present invention, the S/PGW functionality may be separated into an S/PGW (control) part in the central controller and an S/PGW part in the distributed GW, and the IP address management function (which is exemplified as an IP address assignment function in FIGS. 7 to 9) is located at the central controller. That is to say, exemplary embodiments of the present invention enable a separation of control plane and user plane functionalities within a (logical) gateway entity, such as e.g. a (logical) PGW.

The central controller handles IP address management (such as IP address assignment) including IP layer signaling for the local link for hosts/UEs instead of or on behalf of distributed access routers or distributed GWs. In addition thereto, the central controller handles distributed GW control.

The central controller corresponds especially to CP functions of standard SGW and PGW, and the distributed GW corresponds especially to UP functions of standard SGW and PGW. Irrespective thereof, also the central controller may contain full S/PGW functionality (including CP and UP parts), which may be specifically effective as a backup solution and/or for other purpose like legal interception . . . .

It is to be noted that the central controller provides for routing protocol functionality (e.g. OSPF, BGP) towards neighboring networks. Further, the central controller is capable of interworking with an AAA server and/or a DHCP server for the purpose of IP address management. Still further, the central controller provides the functionality of the first hop router in the network independent of how the traffic is routed and at what point/distributed GW it is handed over to other (private/external) networks/the Internet.

As shown in FIGS. 7 to 9, similar to FIG. 4 above, a first (e.g. GTP) tunnel is established between the distributed GW and the access network/node, and a second (e.g. GTP) tunnel is established in addition to a control interface between the distributed GW and the central controller. According to exemplary embodiments of the present invention, the interface link between the central controller and the distributed GW, including the tunnel and the control interface, is operable as a S11+ interface.

While the tunnels are exemplarily depicted as GTP tunnels in FIGS. 7 to 9, it is noted that any tunneling protocol may be used in this regard. Yet, it is preferable that the same tunneling protocol is used for both tunnels.

Generally, the protocol used for the two tunnels according to exemplary embodiments of the present invention may be utilized as protocol for a centralized IP address management (instead of AAA and/or DHCP protocol application in the distributed GWs).

FIG. 7 shows a schematic diagram of a first example of a 3GPP-based network architecture for Internet access according to exemplary embodiments of the present invention. The exemplary network architecture of FIG. 7 illustrates user/host-specific GTP tunnels at S1-U and S11+ interfaces, with a central controller having no MME function.

As shown in FIG. 7, the centralized controller is operable at or by an entity connecting a mobility management entity (MME) and at least one distributed GW, such as at least one S/PGW. Accordingly, the central controller terminates the related GW signaling with the MME, i.e. the mobility controller, thus interworking with the MME.

That is to say, the central S/PGW control according to exemplary embodiments of the present invention could be stand-alone.

FIG. 8 shows a schematic diagram of a second example of a 3GPP-based network architecture for Internet access according to exemplary embodiments of the present invention. The exemplary network architecture of FIG. 8 illustrates user/host-specific GTP tunnels at S1-U and S11+ interfaces, with a central controller having a MME function.

As shown in FIG. 8, the centralized controller is operable at or by a mobility management entity (MME). Accordingly, the central controller as such, or the entity implementing the central controller, also comprises the mobility controller functionality.

That is to say, the central S/PGW control according to exemplary embodiments of the present invention could be combined with an MME function/entity.

FIG. 9 shows a schematic diagram of a third example of a 3GPP-based network architecture for Internet access according to exemplary embodiments of the present invention. The exemplary network architecture of FIG. 9 illustrates user/host-specific GTP tunnels at S1-U and S11+ interfaces, with a combination of the distributed GW with an OpenFLow switch and the central controller with the OpenFlow controller.

As shown in FIG. 9, the centralized controller is operable at or by an OpenFlow (OF) control entity or an entity comprising an OpenFlow (OF) control entity. Accordingly, the central controller as such, or the entity implementing the central controller, also comprises an OpenFlow control functionality. Further, any distributed GW comprises an OpenFlow (OF) switch, which constitutes a corresponding OpenFlow (OF) message tunnel with the OpenFlow (OF) control entity at the central controller.

In the exemplary network architecture of FIG. 9, the OF message tunnel and the S11+ interface (comprising the tunnel and the control interface thereof) are illustrated as separate connections. Alternatively, it is also feasible that the OF message tunnel is used to carry S11+ control messages to the distributed GW. In this case, the OF message tunnel could additionally serve as control interface of the S11+, and the S11+ interface could only comprise the tunnel thereof.

That is to say, the central S/PGW control according to exemplary embodiments of the present invention could be combined with an OpenFlow control function/entity.

Stated in other words, the central IP address management/assignment can be combined with OpenFLow control of the network, which is also centralized. Then, the OpenFLow controller can be part of the central controller, and the distributed GW can also contain an OpenFLow-controlled switch, wherein such functionality of flow routing may be used for the traffic inspection and separation function at the distributed GW. This is because the traffic inspection according exemplary embodiments of the present invention may be realized by an OF switch on the basis of packet header information.

It is noted that the central controller would also be operable at or by an entity comprising MME functionality and an OpenFlow control functionality. That is to say, even a combination of the concepts underlying the network architectures according to FIGS. 8 and 9 above is feasible. That is to say, the central S/PGW control according to exemplary embodiments of the present invention could be combined with both an MME function/entity and an OpenFlow control function/entity.

As compared with the network architecture according to FIG. 7, any one of the network architectures according to FIG. 8, FIG. 9 and a combination of FIGS. 8 and 9 could beneficially avoid the introduction of an additional network element in the overall system architecture.

In view of the above, exemplary embodiments of the present invention provide for centralized IP address management including IP address assignment for distributed gateways.

According to exemplary embodiments of the present invention, the functionality of IP address management including IP address assignment in a network architecture with distributed gateways (or access routers) to connected hosts may be improved in terms of a reduction of network management efforts. Further, such centralized IP address management provides benefits in terms of flexibility e.g. in terms of a smooth IP address change, also considering potential changes and/or relocations in the overall architecture and/or the GW distribution scenario, thereby also supporting efficiency in terms of routing optimization, load balancing, and the like.

According to exemplary embodiments of the present invention, the functionality to manage/assign IP addresses by distributed gateways or access routers to connected devices can be centralized into a central controller, while avoiding routing all user traffic mandatorily to the central controller. Thereby, "IP control layer packets" or the like, which may contribute to IP address management/assignment, are enabled to travel though the central controller, but it is avoided as much as possible that standard user IP traffic has to go to the centralized site.

As a result thereof, distributed switches/GWs can be assigned to terminate (e.g. 3GPP-specific) tunneling for maximal routing optimization e.g. for local traffic (like access to local caches, IMS UP traffic, etc.). At the same time, the operator can assign all management interfaces that are needed for IP address management to one central controller (router/GW) only, which represents the distributed routers/GWs in the network from a centralized network perspective. This kind of centralization can also provide benefits for a more efficient hardware utilization of the centralized network elements (e.g. can run in a cloud computing environment). In this regard, it is effectively utilized that the control plane has a better overall network view and, based on that information, it can provide more network-wide optimal GW allocation and IP address management.

Specifically, besides the aforementioned benefits resulting from the distribution of (Internet) gateways (such as more direct/optimal routing), the following benefits may be achieved. Namely, irrespective of centralized IP address management, user plane processing may be maintained decentralized (or may be even more distributed), thereby ensuring efficient routing.

Firstly, centralization of network management and control functions may be enhanced. Thereby, both operational cost and capital expenditure of the overall system may be reduced. In this regard, the splitting between CP and UP control functionality between the central controller and the distributed GW is specifically effective. Such centralization is especially beneficial for network architectures with a large number of other network functions/nodes, such as in the case of distributed GWs adopted herein.

Secondly, virtualization technologies in network nodes and devices like virtual machines, cloud computing may be enhanced. Thereby, the utilization level of the installed hardware may be increased, and the trend/effectiveness of centralization may be supported.

Thirdly, network virtualization and programmable networks may be achieved. Thereby, cost efficiency of future networks e.g. due to network sharing may be attained. This is specifically effective when using OpenFlow-based solutions, as the OpenFlow protocol was designed to standardize a separation of control and user plane functions in transport networks. Accordingly, further cost savings may be realized in that network nodes for routing and switching can become less expensive as they provide simplified functionality, and/or the control plane can be centralized. Such control plane centralization in turn allows less expensive network management for the operator, and decision making using information of the whole network view. The control plane of the transport network can cooperate or can be combined with the (mobile) network control functions, which allows further optimization of resource usage.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 10, while for the sake of brevity reference is made to the detailed description of respective corresponding schemes, methods and functionality, principles and operations according to FIGS. 4 to 9.

Figure 10:
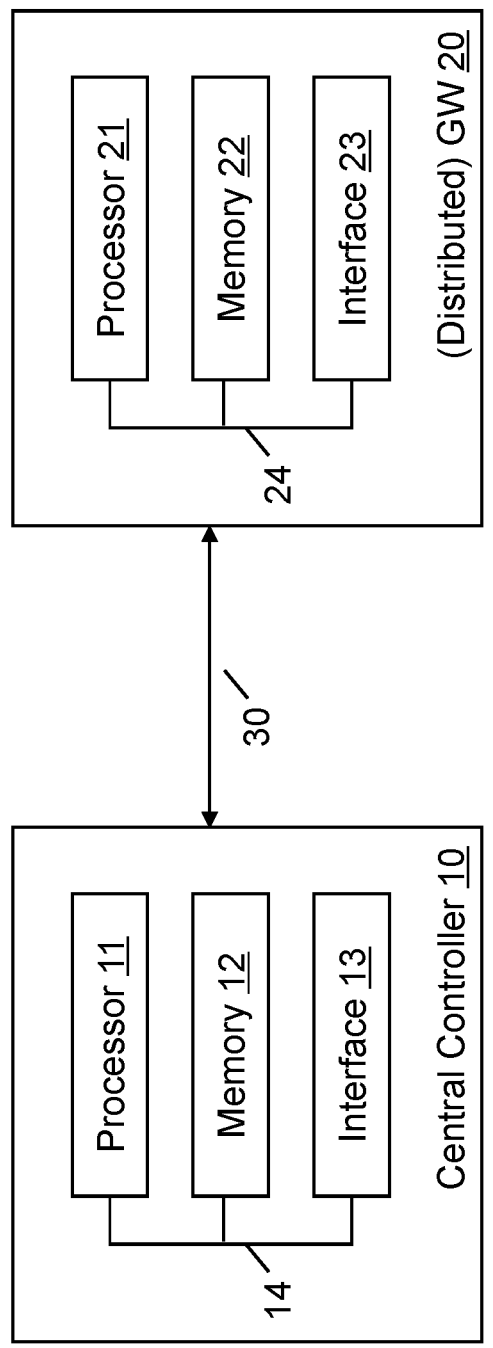
FIG. 10 shows a schematic diagram of exemplary apparatuses according to exemplary embodiments of the present invention.

In FIG. 10 below, the solid line blocks are basically configured to perform respective operations as described above. The entirety of solid line blocks are basically configured to perform the methods and operations as described above, respectively. With respect to FIG. 10, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 10, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 10 shows a schematic diagram of exemplary apparatuses according to exemplary embodiments of the present invention.

In view of the above, the thus illustrated apparatuses 10 and 20 are suitable for use in practicing the exemplary embodiments of the present invention, as described herein.

The thus illustrated apparatus 10 may represent a (part of a) central controller, and may be configured to perform a procedure and/or exhibit a functionality as described in connection with any one of FIGS. 4 to 9. The thus illustrated apparatus 20 may represent a (part of a) gateway or access router entity, and may be configured to perform a procedure and/or exhibit a functionality as described in connection with any one of FIGS. 4 to 9.

Any one of the thus illustrated apparatuses 10 and 20, as well as their architectural relationship and/or system-related interrelation, may be configured as depicted in any one of FIGS. 4 and 7 to 9. A combination of apparatuses 10 and 20 may constitute a logical gateway entity according to exemplary embodiments of the present invention.

As indicated in FIG. 10, according to exemplary embodiments of the present invention, each of the apparatuses 10/20 comprises a processor 11/21, a memory 12/22 and an interface 13/23, which are connected by a bus 14/24 or the like, and the apparatuses may be connected via a link 30, respectively.

The processor 11/21 and/or the interface 13/23 may also include line interface or the like to facilitate communication over a (hardwire or wireless) link, respectively. The interface 13/23 may include a suitable transceiver communication means for (hardwire or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform managing, at a centralized controller entity, IP addresses for hosts being linked with a plurality of distributed gateway entities via a first host-specific tunnel, and controlling the plurality of distributed gateway entities in terms of Internet protocol address management from the centralized controller entity via a second host-specific tunnel on the basis of the managed IP addresses for the hosts.

Accordingly, stated in other words, the apparatus 10 may comprise respective means for managing IP addresses and means for controlling one or more distributed gateway entities.

As outlined above, in various forms, the apparatus 10 may comprise one or more of respective functionalities or means for controlling the plurality of distributed gateway entities in terms of distributed gateway control, receiving IP layer control messages, utilizing IP layer control messages in IP address management, establishing the second user-specific tunnel, setting an IP address, signaling a parameter indicative of application of IP address management, triggering context establishment, and/or providing a first-hop router function for providing Internet connectivity for the hosts.

In its most basic form, according to exemplary embodiments of the present invention, the apparatus 20 or its processor 21 is configured to perform providing a distributed gateway function for hosts being linked via a first host-specific tunnel, obtaining control of IP address management for the hosts from a centralized controller entity via a second host-specific tunnel, and supervising IP address management for the hosts via the first host-specific tunnel on the basis of the obtained control of IP address management for the hosts.

Accordingly, stated in other words, the apparatus 20 may comprise respective means for providing a distributed gateway function, means for obtaining control of IP address management, and means for supervising IP address management for the hosts.

As outlined above, in various forms, the apparatus 20 may comprise one or more of respective functionalities or means for obtaining distributed gateway control and controlling traffic of the hosts on the basis of the obtained distributed gateway control, inspecting traffic of the hosts, separating inspected IP layer control messages from the traffic and relaying the separated IP layer control messages to the centralized controller, establishing the first host-specific tunnel and/or the second host-specific tunnel, receiving a parameter indicative of application of IP address management at the centralized controller entity, performing context establishment, and/or providing a user-plane routing function for routing traffic of the hosts.

For further details regarding the operability/functionality of the individual apparatuses, reference is made to the abode description in connection with any one of FIGS. 4 to 9, respectively.

According to exemplarily embodiments of the present invention, the processor 11/21, the memory 12/22 and the interface 13/23 may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for centralized IP address management for distributed gateways. Such measures exemplarily comprise management of IP addresses for hosts being linked with a plurality of distributed gateway entities via a first host-specific tunnel at a centralized controller entity, and control of the plurality of distributed gateway entities in terms of Internet protocol address management from the centralized controller entity via a second host-specific tunnel on the basis of the managed Internet protocol addresses for the hosts. Accordingly, control-plane and user-plane functions may be separated between the centralized controller entity and the plurality of distributed gateway entities.

The measures according to exemplary embodiments of the present invention may be applied for any kind of network environment, such as for example for fixed communication systems e.g. in accordance with any related IEEE/I ETF standard and/or mobile communication systems e.g. in accordance with any related standards of 3GPP and/or 3GPP2, and so on, e.g. UMTS standards and/or HSPA standards and/or LTE standards (including LTE-Advanced and its evolutions) and/or WCDMA standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Program
AAA Authentication Authorization and Accounting
BRAS Broadband Remote Access Server
BGP Border Gateway Protocol
BS Base Station
CDN Content Delivery Network
CP Control Plane
DHCP Dynamic Host Configuration Protocol
eNB evolved Node B (E-UTRAN base station)
EPC Evolved Packet Core (in the EPS)
EPS Evolved Packet system (i.e. LTE RAN and EPC)
GGSN GPRS Support Node
GPRS General Packet Radio Service
GTP GPRS Tunneling Protocol
GW Gateway
IEEE Institute of Electrical and Electronics Engineer
IETF Internet Engineering Task Force
IMSI International Mobile Subscriber Identity
IP Internet Protocol
LTE Long Term Evolution
MME Mobility Management Entity
NAS Non Access Stratum (i.e. signaling between MME and UE)
OF OpenFlow
OSPF Open Shortest Path First
PDN Packet Data Network
PGW PDN GW
RAN Radio Access Network
SGW Serving GW
UE User Equipment
UP User Plane
UMTS Universal Mobile Telecommunications System
UTRAN Universal Terrestrial Radio Access Network
WCDMA Wideband Code Division Multiple Access

The invention claimed is:

1. A method implemented by a centralized controller entity, comprising:
   managing control plane functions on behalf of a distributed gateway entity that manages user plane functions, and managing Internet protocol addresses for a user equipment that is linked with the distributed gateway entity via a first host-specific tunnel;
   controlling the distributed gateway entity in terms of internet protocol address management via a second host-specific tunnel on the basis of the managed internet protocol addresses for the user equipment comprising:
   receiving, via the distributed gateway entity, router solicitation messages that are separated from inspected traffic of the user equipment linked with the distributed gateway entity;
   allocating an IPv6 prefix for the user equipment, and
   sending router advertisement messages in the second host-specific tunnel to the distributed gateway entity back to the user equipment.

2. The method according to claim 1, further comprising controlling the distributed gateway entity in terms of distributed gateway control from the centralized controller entity via a control interface.

3. The method according to claim 1, further comprising receiving Internet protocol layer control messages from traffic of the user equipment from the distributed gateway entity via the second host-specific tunnel.

4. The method according to claim 3, wherein the Internet protocol layer control messages comprise at least one of: neighbor discovery protocol messages and dynamic host configuration protocol messages.

5. The method according to claim 3, further comprising at least one of:
   establishing the second host-specific tunnel to the distributed gateway entity in the context of session establishment via the control interface,
   setting an Internet protocol address of the centralized controller entity for establishing the second host-specific tunnel,
   signaling a parameter indicative of application of Internet protocol address management at the centralized controller entity to the distributed gateway entity, and triggering context establishment at the distributed gateway entity.

6. The method according to claim 1, further comprising providing a first-hop router function for providing Internet connectivity for the user equipment.

7. The method according to claim 1, further comprising at least one of:
interworking with at least one of a dynamic host configuration entity and an authentication, authorization and accounting entity,
interworking with a mobility management entity, and
the first and second host-specific tunnels are operable in accordance with a General Packet Radio Service (GPRS) tunneling protocol.

8. The method according to claim 1, wherein
the centralized controller entity is operable at or by an entity connecting a mobility management entity and a at least one of a serving and packet data network gateway entity.

9. A computer program product comprising computer-executable computer program code embodied on a non-transitory computer-readable medium which, when the program is run on a computer, is configured to cause the computer to carry out the method according to claim 1.

10. A centralized controller entity to manage control plane functions on behalf of a distributed gateway entity that manages user plane functions, and manage Internet protocol addresses for a user equipment that is linked with the distributed gateway entity via a first host-specific tunnel, wherein the centralized controller entity comprises:
an interface configured to communicate with the distributed gateway entity,
a memory configured to store computer program code, and
a processor configured to cause the centralized controller entity to perform:
controlling the distributed gateway entity in terms of internet protocol address management via a second host-specific tunnel on the basis of the managed internet protocol addresses for the user equipment comprising:
receiving via the distributed gateway entity router solicitation messages of the user equipment linked with the distributed gateway entity,
allocating an IPv6 prefix for the user equipment, and
sending router advertisement messages in the second host-specific tunnel to the distributed gateway entity back to the user equipment.

11. The centralized controller entity according to claim 10, wherein the processor is further configured to cause the centralized controller entity to perform:
controlling the distributed gateway entity in terms of distributed gateway control from the centralized controller entity via a control interface.

12. The centralized controller entity according to claim 10, wherein the Internet protocol layer control messages from traffic of the user-equipment from the distributed gateway entity are received via the second host-specific tunnel.

13. The centralized controller entity according to claim 12, wherein
the Internet protocol layer control messages one or more of comprise neighbor discovery messages and dynamic host configuration messages.

14. The centralized controller entity according to claim 12, wherein the processor is further configured to cause the centralized controller entity to perform at least one of:
establishing second host-specific tunnel to the distributed gateway entities in the context of session establishment via the control interface,
setting an Internet protocol address of the centralized controller entity for establishing the second host-specific tunnel,
signaling a parameter indicative of application of Internet protocol address management at the centralized controller entity to the distributed gateway entity, and
triggering context establishment at the distributed gateway entity.

15. The centralized controller entity according to claim 10, wherein the processor is further configured to cause the centralized controller entity to perform:
providing a first-hop router function for providing Internet connectivity for the user equipment.

16. The centralized controller entity according to claim 10, wherein the processor is further configured to cause the centralized controller entity to further perform at least one of:
interworking with at least one of a dynamic host configuration entity and an authentication, authorization and accounting entity,
interworking with a mobility management entity, and
the first and second host-specific tunnels are operable in accordance with a General Packet Radio Service (GPRS) tunneling protocol.

17. The centralized controller entity according to claim 10, wherein
the centralized controller entity is operable at or by an entity connecting a mobility management entity and at least one of a serving and packet data network gateway entity.

18. The centralized controller entity according to claim 10, wherein
the centralized controller entity comprises at least one control-plane function of at least one of a serving and packet data network gateway entity.

19. A distributed gateway entity comprising:
an interface configured to communicate with a centralized controller entity,
a memory configured to store computer program code, and
a processor configured to cause the distributed gateway entity to perform:
managing user plane functions for a user equipment that is linked with the distributed gateway,
sending to the centralized controller entity, which manages control plane functions on behalf of the distributed gateway entity, Internet Protocol layer control messages received from traffic of the user equipment linked with the distributed gateway entity,
supervising the centralized controller entity utilizing the received Internet protocol layer control messages to assign IPv6 prefixes for the user equipment, and
sending router advertisement messages from the centralized controller entity to the user equipment, wherein the processor is further configured to cause the distributed gateway entity to perform:
inspecting traffic of the user equipment on a first host-specific tunnel, and
separating inspected Internet protocol layer control messages inspected from the traffic of the user equipment and relaying the separated Internet protocol layer control messages to the centralized controller entity via a second host-specific tunnel.

20. The distributed gateway entity according to claim 19, wherein the processor is further configured to cause the distributed gateway entity to perform:
   obtaining distributed gateway control from the centralized controller entity via a control interface, and
   controlling traffic of the user equipment via a first host-specific tunnel on the basis of the obtained distributed gateway control.

21. The distributed gateway entity according to claim 19, wherein
   the Internet protocol layer control messages comprise at least one of neighbor discovery messages and dynamic host configuration messages.

22. The distributed gateway entity according to claim 19, wherein the processor is further configured to cause the distributed gateway entity, to perform at least one of:
   establishing at least one of a first host-specific tunnel and a second host-specific tunnel in the context of session establishment,
   receiving a parameter indicative of application of Internet protocol address management at the centralized controller entity from the centralized controller entity and
   performing context establishment upon triggering by the centralized controller entity.

23. The distributed gateway entity according to claim 19, wherein the processor is further configured to cause the distributed gateway entity to perform:
   providing a user-plane routing function for routing traffic of the user equipment.

24. The distributed gateway entity according to claim 19, wherein
   a first and a second host-specific tunnels are operable in accordance with a GPRS tunneling protocol.

25. The distributed gateway entity according to claim 19, wherein
the distributed gateway entity comprises at least one user-plane function of at least one of a serving and packet data network gateway entity.

26. A distributed gateway entity comprising:
an interface configured to communicate with a centralized controller entity,
a memory configured to store computer program code, and
a processor configured to cause the distributed gateway entity to perform:
   managing user plane functions for a user equipment that is linked with the distributed gateway,
   sending to the centralized controller entity, which manages control plane functions on behalf of the distributed gateway entity, Internet Protocol layer control messages received from traffic of the user equipment linked with the distributed gateway entity,
supervising the centralized controller entity utilizing the received Internet protocol layer control messages to assign IPv6 prefixes for the user equipment, and
sending router advertisement messages from the centralized controller entity to the user equipment, wherein the processor is further configured to cause the distributed gateway entity to perform at least one of:
establishing at least one of a first host-specific tunnel and a second host-specific tunnel in the context of session establishment,
receiving a parameter indicative of application of Internet protocol address management at the centralized controller entity from the centralized controller entity, and
performing context establishment upon triggering by the centralized controller entity.

\* \* \* \* \*